United States Patent
Imamiya

(10) Patent No.: US 9,044,981 B2
(45) Date of Patent: Jun. 2, 2015

(54) IMAGE PROCESSING APPARATUS AND METHOD FOR OPERATING IMAGE PROCESSING APPARATUS

(71) Applicants: KABUSHIKI KAISHA TOSHIBA, Tokyo (JP); Toshiba Tec Kabushiki Kaisha, Tokyo (JP)

(72) Inventor: Koji Imamiya, Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 13/974,489

(22) Filed: Aug. 23, 2013

(65) Prior Publication Data
US 2014/0055546 A1    Feb. 27, 2014

(30) Foreign Application Priority Data

Aug. 27, 2012 (JP) ................................. 2012-186956
Apr. 25, 2013 (JP) ................................. 2013-092525

(51) Int. Cl.
| B41M 7/00 | (2006.01) |
| B41J 29/36 | (2006.01) |
| G03G 15/20 | (2006.01) |
| G03G 21/00 | (2006.01) |

(52) U.S. Cl.
CPC .................. *B41J 29/36* (2013.01); *G03G 21/00* (2013.01); *B41M 7/0009* (2013.01); *B41M 7/00* (2013.01); *G03G 15/205* (2013.01)

(58) Field of Classification Search
USPC .................................................. 347/179, 212
See application file for complete search history.

(56) References Cited

U.S. PATENT DOCUMENTS

| 7,208,449 B2 | 4/2007 | Sano et al. |
| 8,553,248 B2 * | 10/2013 | Kumagai et al. ............. 358/1.15 |
| 2009/0103147 A1 | 4/2009 | Murakami |
| 2011/0236843 A1 | 9/2011 | Iguchi et al. |
| 2011/0262197 A1 | 10/2011 | Imamiya et al. |

FOREIGN PATENT DOCUMENTS

| JP | H08-123266 | 5/1996 |
| JP | H11-249511 | 9/1999 |
| JP | 2005-205625 A | 8/2005 |

OTHER PUBLICATIONS

Office Action dated Jan. 21, 2014, filed in corresponding Japanese Patent Application No. 2013-092525, with English translation.

\* cited by examiner

*Primary Examiner* — Huan Tran
(74) *Attorney, Agent, or Firm* — Patterson & Sheridan LLP

(57) ABSTRACT

According to one embodiment, an image processing apparatus includes a heating unit configured to heat an image formed on a sheet, and a control unit configured to control a temperature of the heating unit to be (i) above a first temperature when performing an image erasing operation on a first sheet supplied thereto, and (ii) below a second temperature that is lower than the first temperature when performing an image fixing operation on a second sheet supplied thereto. The control unit permits a first type of job to interrupt a currently-executing job while the image erasing operation is being performed and prohibits a second type of job from interrupting the currently-executing job while the image erasing operation is being performed.

20 Claims, 13 Drawing Sheets

IMAGE PROCESSING APPARATUS AND METHOD FOR OPERATING IMAGE PROCESSING APPARATUS

CROSS-REFERENCE TO RELATED APPLICATION

This application is based upon and claims the benefit of priority from Japanese Patent Application No. 2012-186956, filed Aug. 27, 2012, and Japanese Patent Application No. 2013-092525, filed Apr. 25, 2013, the entire contents of which are incorporated herein by reference.

FIELD

Embodiments described herein relate generally to an image processing apparatus and a method for operating the image processing apparatus.

BACKGROUND

An image forming apparatus which performs an image formation using a decolorable recording material (for example, a toner) and an image decoloring apparatus which can decolor an image formed on a sheet are known. A decolorable of toner has a coloring matter and a color former, and bonding between the two is broken by heating, so that the decoloring may result. In the image decoloring apparatus of the related art, in order to decolor a toner image, it is necessary to heat the toner image, for example, for a first length of time, and then cool the toner image for a second length of time.

Since in many applications, the total length of time to decolor the toner image is very long, the image decoloring operation is generally performed in an image decoloring apparatus that is separate from an image forming apparatus.

DETAILED DESCRIPTION

The embodiments provides a single image processing apparatus that perform both the image forming and the image decoloring, using a toner that can be decolored in a sufficiently short time.

In general, according to embodiments, an image processing apparatus includes a heating unit configured to heat an image formed on a sheet, and a control unit configured to control a temperature of the heating unit to be (i) above a first temperature when performing an image erasing operation on a first sheet supplied thereto, and (ii) below a second temperature that is lower than the first temperature when performing an image fixing operation on a second sheet supplied thereto. The control unit is further configured to permit a first type of job to interrupt a currently-executing job while the image erasing operation is being performed and prohibit a second type of job from interrupting the currently-executing job while the image erasing operation is being performed.

(First Embodiment)

Figure 1:
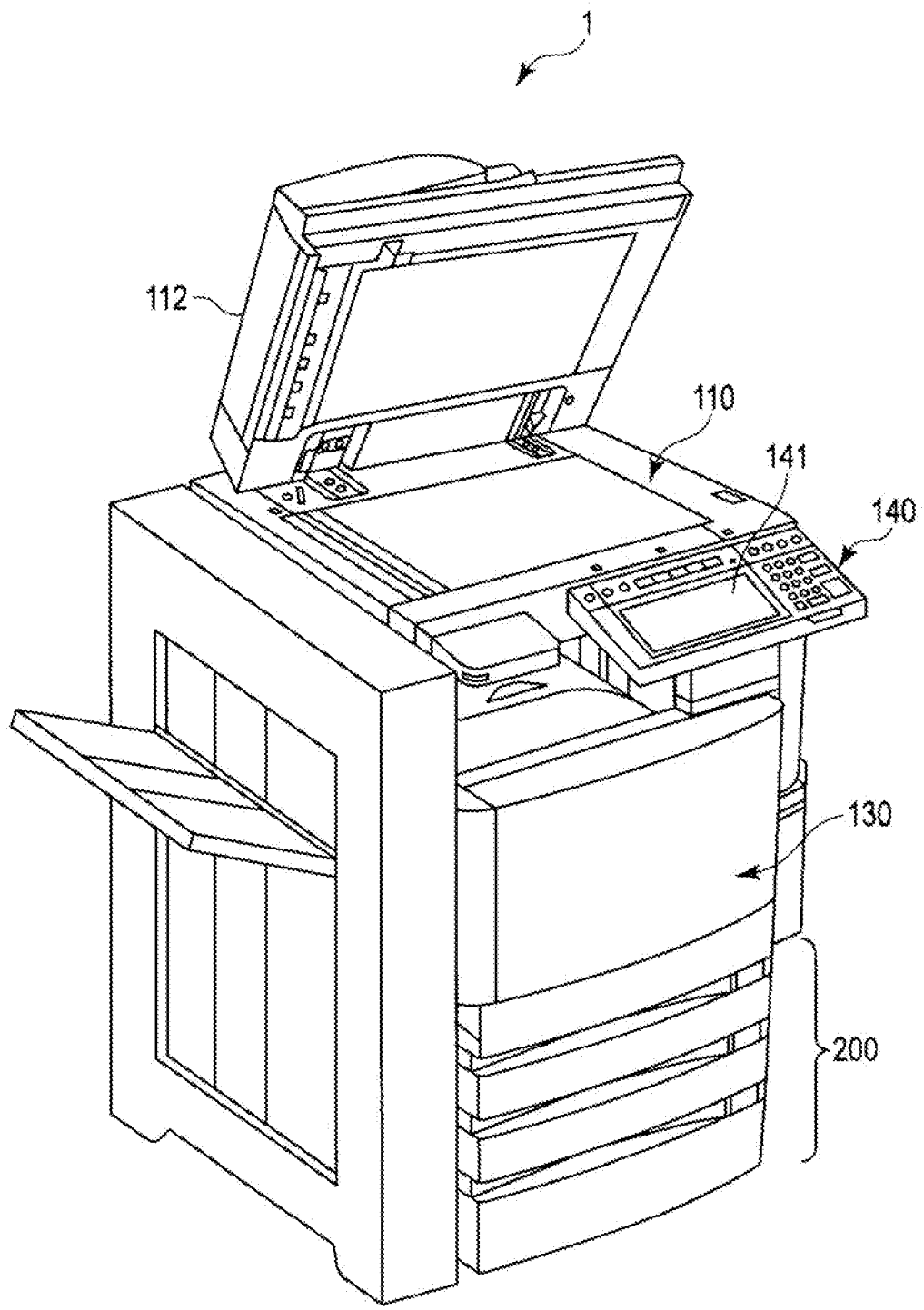
FIG. 1 is an external view of an image forming apparatus according to a first embodiment.

FIG. 1 is an external view of an image forming apparatus according to a first embodiment.

An image forming apparatus 1 has a printing section 130, a paper tray 200, a scanning section 110, an auto feed section 112, and a control panel 140.

The printing section 130 outputs image information as an output image, for example, referred to as a hard copy or a printout. The paper tray 200 supplies to the printing section 130 an output medium, which is paper of any size used in the image output. The scanning section 110 acquires the image information as image data from a document. The auto feed section 112 delivers a document of which reading is completed from a reading position to a discharging position and guides a next document to the reading position. The control panel 140 is an instruction input section for instructing operation to be performed by the image forming apparatus 1 such as start of image formation in the printing section 130 or start of reading the document by the scanning section 110. The control panel 140 has a display section 141 for inputting the instruction and displaying the information to an operator.

Figure 2:
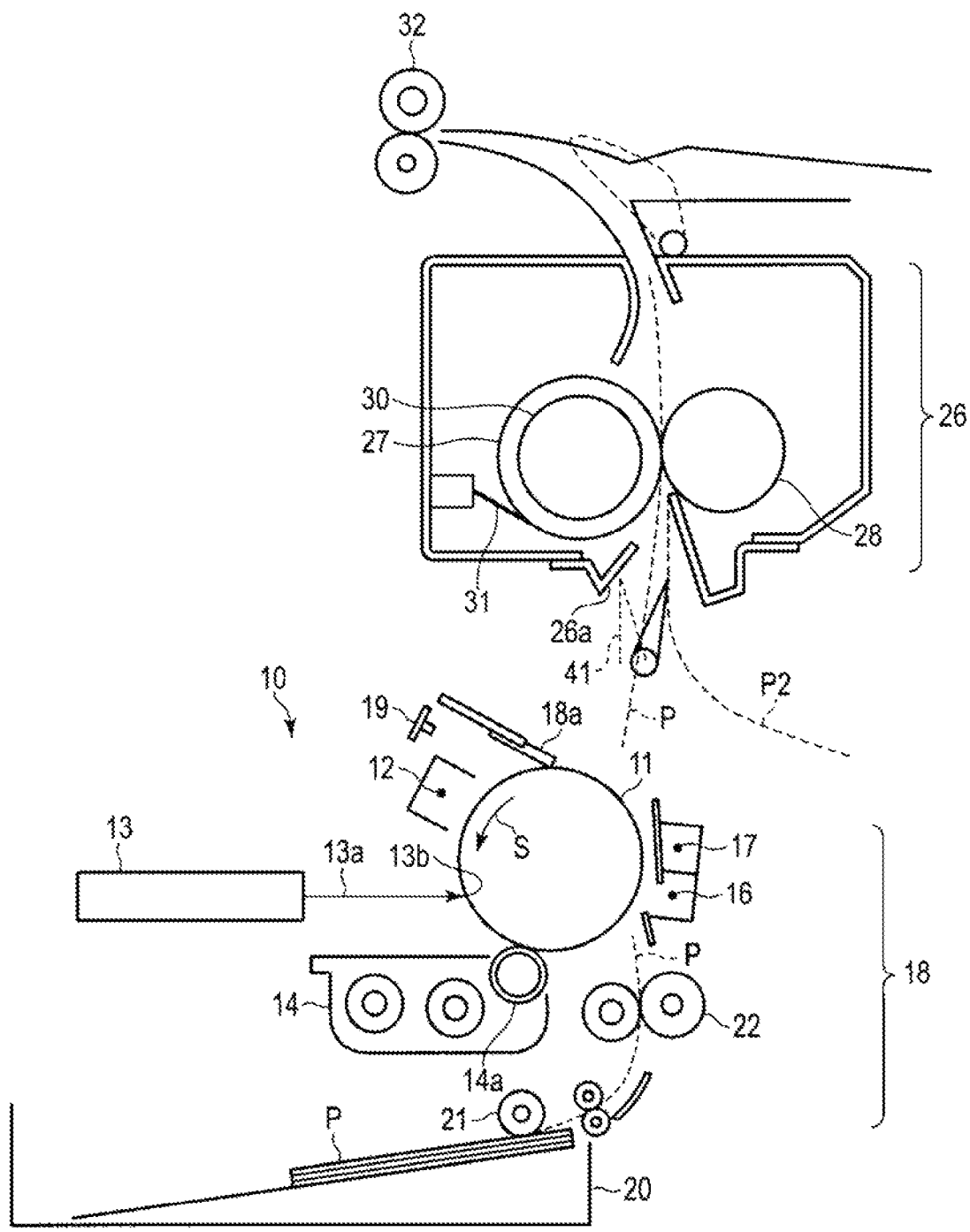
FIG. 2 illustrates an inner structure of the image forming apparatus according to the first embodiment.

FIG. 2 illustrates an inner structure, including an image forming section 10 and a fixing device 26, of the image forming apparatus 1 according to the first embodiment. The image forming apparatus 1 of the first embodiment performs the image formation with a toner which can be decolored by heating. In addition, the image forming apparatus 1 has a function of decoloring a toner image.

A photoconductive drum 11 of the image forming section 10 includes an organic photoconductor (OPC) on a surface of a supporting member having φ60 mm. The photoconductive drum 11 is driven in the direction of an arrow S at a circumferential velocity of 215 mm/sec (a first paper transportation velocity). An electric charger 12, a laser exposure device 13, a developing device 14, a transfer charger 16, a peeling charger 17, a cleaner 18 including a cleaning blade 18a, and a neutralization LED 19 are disposed along a circumference of the photoconductive drum 11.

The electric charger 12 uniformly charges an entire surface of the photoconductive drum 11 at −750 V according to a rotation of the photoconductive drum 11. The laser exposure device 13 irradiates a laser beam 13a corresponding to image data on an irradiation position 13b of the photoconductive drum 11 which is electrically charged.

Paper P that is a recording medium is taken out by a feeding roller 21 from a feeding cassette device 20. The paper P is transported to a position adjacent to the transfer charger 16 of the image forming section 10 by resist rollers 22 in accordance with the toner image being formed on the photoconductive drum 11. An unfixed toner image formed of a decoloring toner is formed on the paper P at the image forming section 10. The feeding cassette device 20 can feed both unused paper and reused paper.

The fixing device 26 is disposed above the image forming section 10. The fixing device 26 heats and presses the paper P and fixes the toner image onto the paper P, which is the recording medium. The fixing device 26 has a fixing roller 27, which is a fixing rotation body, and a pressing roller 28, which is a pressing rotation body and which is pressed against the fixing roller 27. In addition, the fixing device 26 has an inlet guide 26a, which leads the paper P into a lip between the fixing roller 27 and the pressing roller 28.

The fixing roller 27 is formed by coating polytetrafluoroethylene (PTFE) on a surface of a hollow cylindrical cylinder made of iron. The fixing roller 27 has an induction heating coil (IH coil) 30 inside thereof. The induction heating is directly performed on the fixing roller from the inside thereof. A thermistor 31 detects a temperature of the surface of the fixing roller 27. A current of the IH coil 30 is controlled based on an output of the thermistor 31, and the temperature of the surface of the fixing roller 27 is controlled to be at a predetermined temperature.

The pressing roller 28 is formed by forming an elastic layer made of foamed silicone sponge rubber or the like on a metal shaft and by coating a copolymer of tetrafluoroethylene and perfluoroalkyl vinyl ether (PFA) tube on the surface thereof. The hardness of the pressing roller 28 is approximately 55° in ASKER-C. The pressing roller 28 achieves low thermal capacity, which enables energy saving, by taking a large lip of approximately 6 mm by the elastic layer.

A discharge roller 32, which discharges the paper P the toner image on which is fixed in a predetermined direction, is provided downstream with respect to the fixing device 26 along a transportation direction of the paper P.

Figure 3:
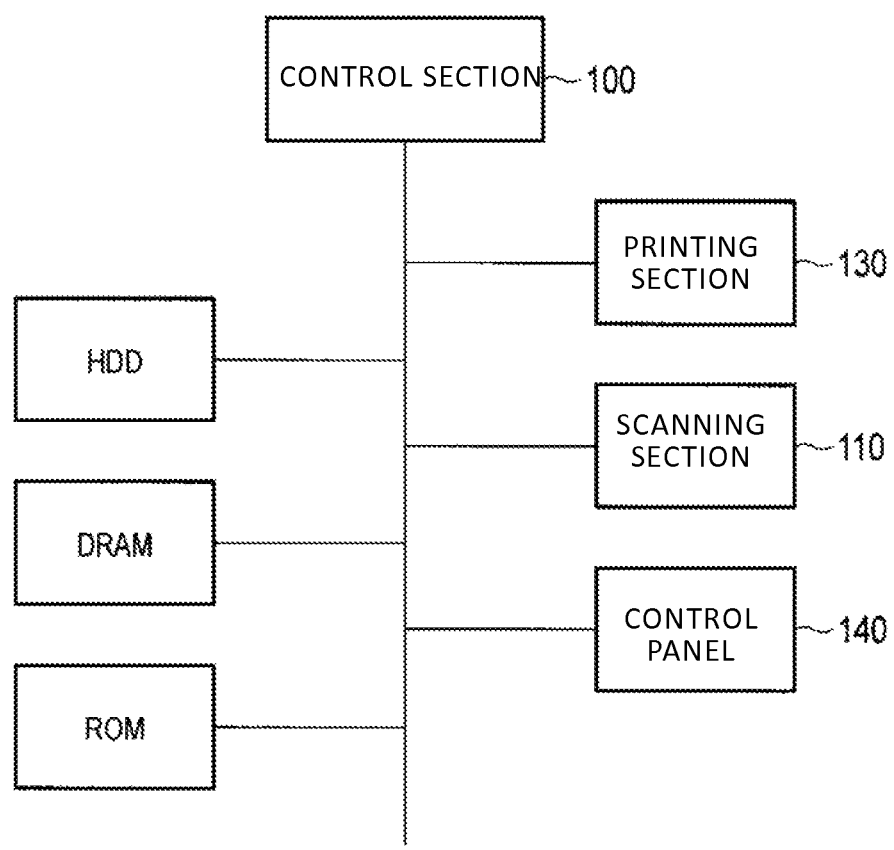
FIG. 3 is a block diagram illustrating a configuration of a control system of the image forming apparatus according to the first embodiment.

FIG. 3 is a block diagram illustrating a control system of the image forming apparatus 1 according to the first embodiment. The image forming apparatus 1 includes a control section 100, ROM, DRAM, and an internal storage device (HDD) in addition to the printing section 130, the scanning section 110, and the control panel 140. Then, these sections are connected to each other with a system bus.

The control section 100 controls each of these sections, which are connected to each other with the system bus. The ROM stores various control programs which are necessary for operating the image forming apparatus 1. Each program for controlling an image forming operation and an image decoloring operation described below is stored in the ROM. Execution of each program is controlled by the control section 100. The DRAM is a buffer memory which temporally stores the data generated when executing each program.

Figure 4:
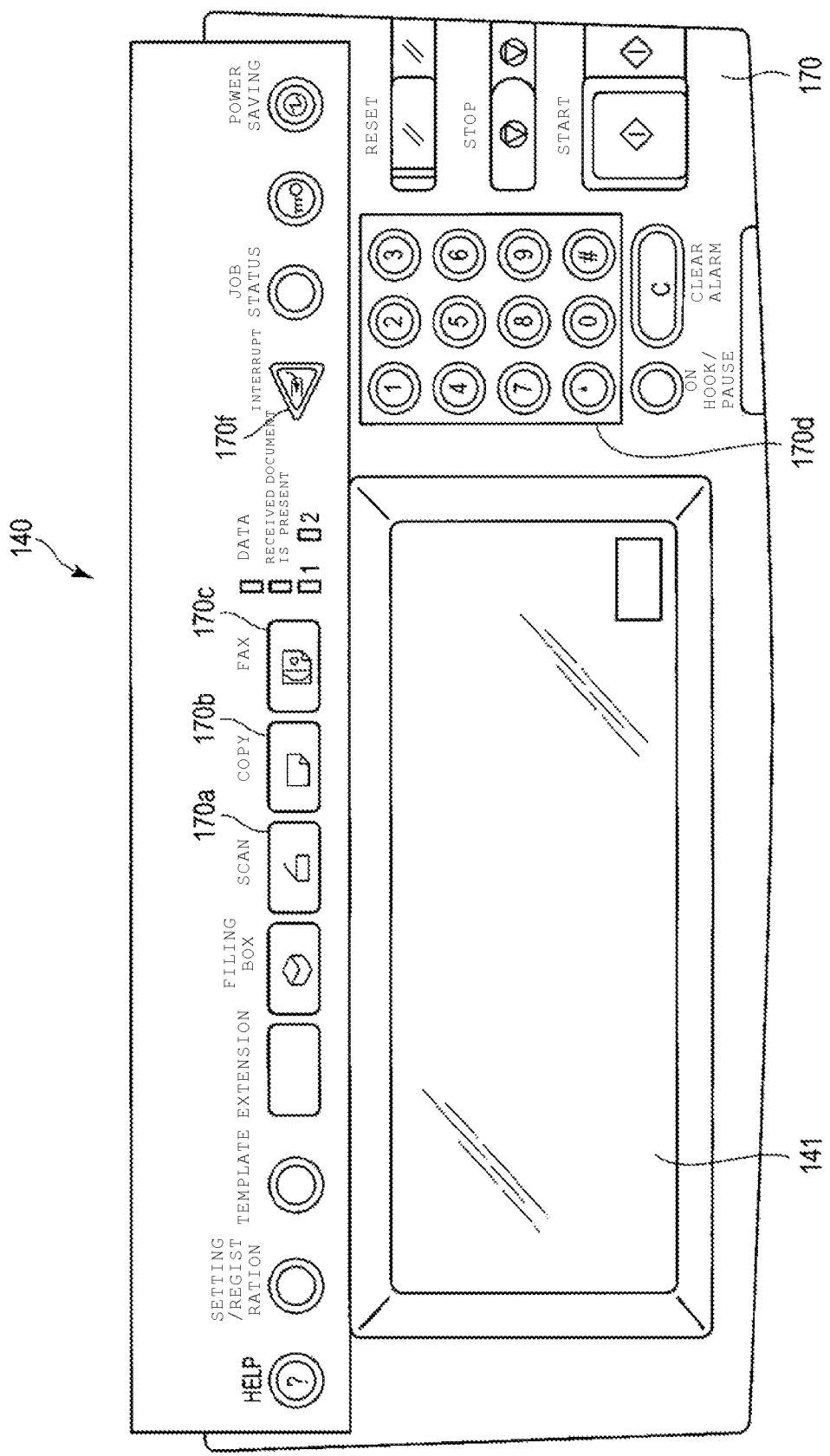
FIG. 4 is an external view of a control panel provided in the image forming apparatus according to the first embodiment.

FIG. 4 is an external view of the control panel 140 provided in the image forming apparatus according to the first embodiment. The control panel 140 has a touch panel display 141 and an operation section 170. The touch panel display 141 is comprised of a touch panel and displays a state of the image forming apparatus 1, operation procedures, various instructions to the user, or the like. The operation section 170 has various operation buttons including a start button for operating the image forming apparatus 1.

For example, in response to a scan button 170a being pressed, the image data is stored in the DRAM of the image forming apparatus 1 by acquiring the image data from the scanned document. In response to a copy button 170b being pressed, the image is formed on the medium, based on the acquired image data. In response to a fax button 170c being pressed, the image formed based on the acquired image data is faxed. In response to a keyboard 170d being operated, numbers are input.

Next, the image formation process performed by the image forming apparatus 1 is described.

The photoconductive drum 11 rotating in the direction of the arrow S at a circumferential velocity of 215 mm/sec (the first paper transportation velocity) is uniformly charged at −750 V by the electric charger 12 in the image forming section 10 in response to the start of the image formation. Then, a laser beam corresponding to the image data is irradiated onto the photoconductive drum 11 by the laser exposure device 13 to form an electrostatic latent image thereon. Next, the electrostatic latent image is developed with the decoloring toner by the developing device 14, and the toner image of the decoloring toner is formed on the photoconductive drum 11.

In the first embodiment, for the decoloring toner, a capsule-type thermal decoloring toner is used. This toner is created by the following chemical method.

(1) Binder Resin and WAX Atomized Liquid

Pes-based resin was used as the binder resin. Resin atomized liquid was made from a high-pressure homogenizer, the Pes-based resin, an anionic emulsifier, and a neutralizing agent.

(2) Adjustment of WAX Dispersion Liquid

Atomized liquid was obtained using rice WAX in the same manner as in the above described resin.

(3) Adjustment of Toner

Leuco dye: crystal violet lactone (CVL), developer: 4-hydroxybenzoic acid benzyl and temperature control agent: benzyloxyphenylethyl-4-laurate.

The temperature control agent controls the decoloring temperature. The temperature control agent is a substance having a large temperature difference between the melting point and the solidification point. When the temperature control agent is heated to a temperature not lower than the melting point of the temperature control agent, the color material can be colored. Further, when the solidification point of the temperature control agent is normal temperature or lower, a color material which maintains a decolored state even at normal temperature, can be formed.

Examples of the temperature control agent include an alcohol, an ester, a ketone, an ether, and an acid amide. Specific examples of ester include an ester of a carboxylic acid containing a substituted aromatic ring, an ester of a carboxylic acid containing an unsubstituted aromatic ring with an aliphatic alcohol, an ester of a carboxylic acid containing a cyclohexyl group in the molecule, an ester of a fatty acid with an unsubstituted aromatic alcohol or a phenol, an ester of a fatty acid with a branched aliphatic alcohol, an ester of a dicarboxylic acid with an aromatic alcohol or a branched aliphatic alcohol, dibenzyl cinnamate, heptyl stearate, didecyl adipate, dilauryl adipate, dimyristyl adipate, dicetyl adipate, distearyl adipate, trilaurin, trimyristin, tristearin, dimyristin, and distearin. Other examples include a mixture of two or more of the above materials.

The above materials are heated and melted and then encapsulated by a known coacervation method. The capsulated color material, the toner binder resin dispersion liquid and the WAX dispersion liquid are aggregated and fused using aluminum sulfate [$Al_2(SO_4)_3$] and further washed and dried, thereby obtaining the toner. An appropriate external additive was added to the toner. The toner is referred to as a capsule-type decoloring toner hereinafter.

In addition, the capsule-type decoloring toner used in the first embodiment was manufactured so that 10 wt % of the toner excluding the external additive consists of the capsulated color material.

The developing device 14 uses a two-component developer which is a mixture of the above described capsule-type decoloring toner having a volume average particle diameter of 5 to 12 μm and a magnetic carrier having a volume average particle diameter of 30 to 80 μm. A link of a coloring matter and a color former in the capsule is cut by heating the decoloring toner image formed on the paper to 90° C. or more and then the color of the toner image is decolored. A developing bias of approximately −550 V is applied to a developing roller 14*a* of the developing device 14, and the toner image is transferred on the electrostatic latent image formed on the photoconductive drum 11 by reversal development.

On the other hand, the paper P is supplied from the feeding cassette device 20. The paper P is sent to a position adjacent to the transfer charger 16 in accordance with the formation of the toner image on the photoconductive drum 11 by the resist rollers 22, and the toner image on the photoconductive drum 11 is transferred onto the paper P.

The paper P onto which the toner image is transferred is sent to the fixing device 26 after the paper P is peeled from the photoconductive drum 11. In addition, the temperature of the surface of the fixing roller 27 is controlled to be at 140° C. The paper P is guided between the fixing roller 27 and the pressing roller 28, and the toner image is heated, pressed, and fixed. Since the fixing roller 27 and the pressing roller 28 have a reverse crown shape, both ends of the paper P are reliably drawn into ahead than a center portion thereof when the paper P is inserted in a nip formed between the fixing roller 27 and the pressing roller 28. The paper P is heated and pressed and the toner image is fixed while being pulled in a direction from the center portion thereof to the end portions thereof due to the reverse crown shape of the pressing roller 28. Accordingly, occurrence of wrinkles is prevented. After the toner image formed of the capsule-type decoloring toner is fixed on the paper P in the fixing device 26, the paper P is discharged in a predetermined direction by the discharge roller 32.

After the transfer is finished, a residual toner remaining on the photoconductive drum 11 is removed by the cleaner 18, residual electric charge is cancelled by the neutralization LED 19, and the image formation process is finished.

The temperature of the capsulated color material does not exceed 90° C. at the circumferential velocity of 215 mm/sec (the first paper transportation velocity) and decoloration does not occur when the image is formed. However, in the example of the embodiment, image density formed of the capsule-type decoloring toner after being fixed onto the paper P is approximately 0.3, at which that the toner image is barely visible. Therefore, in order to ensure the visibility of the image, the ratio of the color material in the capsule-type decoloring toner is desirably 10 wt % or more. In addition, the visibility of the image is evaluated using a measuring instrument (for example, X-rite).

Subsequently, an image decoloring process of the related art is described.

Conventionally, the decoloring of the color of the capsule-type toner image is performed, for example, using an exclusive decoloring apparatus manufactured by Toshiba Ltd, "a decoloring apparatus for e-blue®: TMD-HE01". The paper P is heated at 120 to 150° C. approximately for 2 hours and the color of the toner image is decolored in this apparatus. Then, cooling is automatically performed approximately for 1 hour. When the paper P on which the toner image is decolored is reused, the pieces of paper P, which are slightly attached to each other by the heating, are easily separated from each other and are supplied to the feeding cassette device 20. The reused paper P stored in the feeding cassette device 20 is used for image formation according to the above described image formation process. However, since it takes time to decolor the toner image with the above described decoloring apparatus, such a decoloring apparatus is not suitable for a case where the paper needs to be immediately reused.

In the first embodiment, the image is decolored using the image forming apparatus 1 having an instant decolorable property of the capsule-type decoloring toner.

Figure 5:
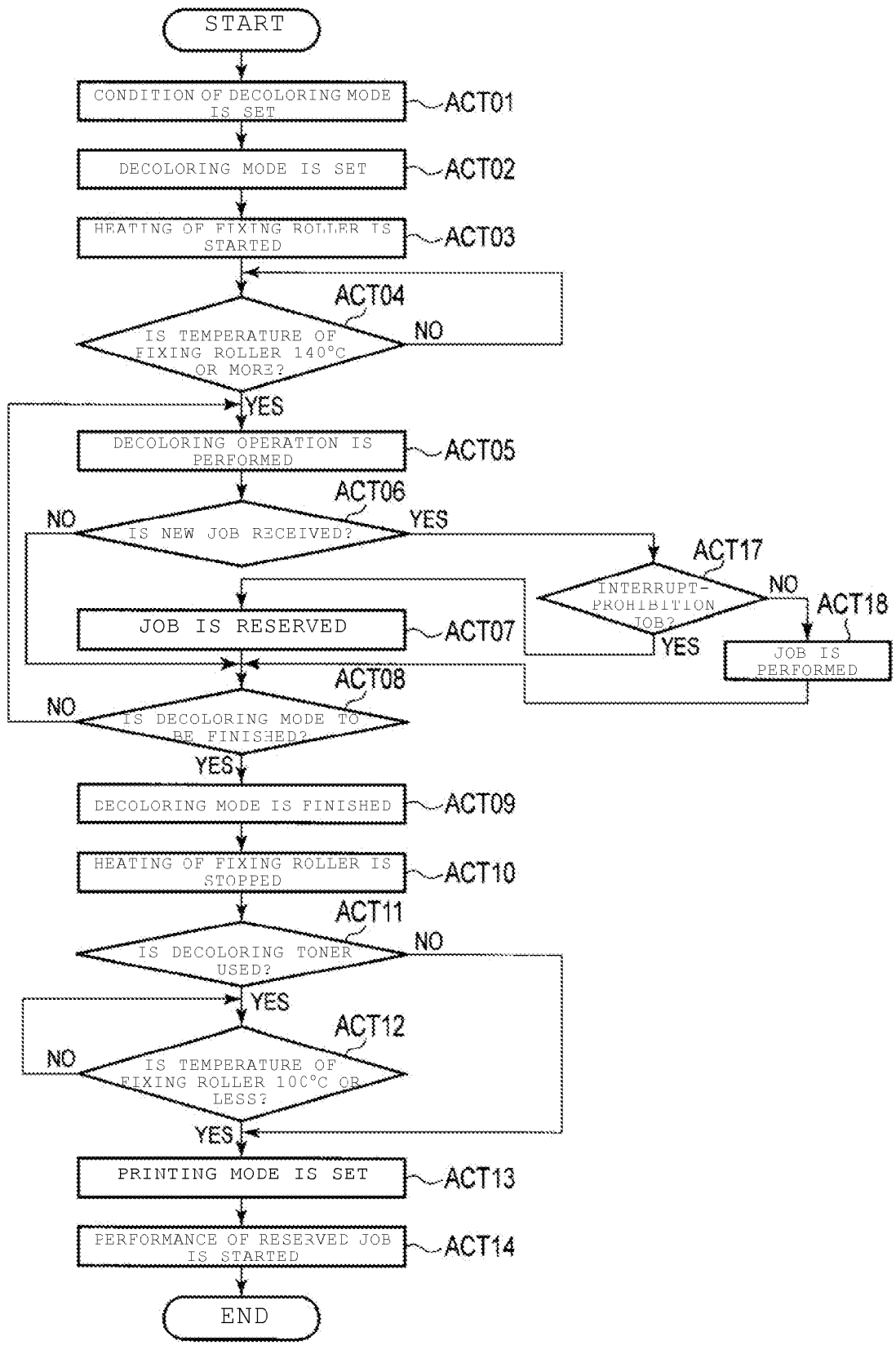
FIG. 5 is a flowchart illustrating an image decoloring operation performed by the image forming apparatus according to the first embodiment.

FIG. 5 is a flowchart illustrating the image decoloring operation performed by the image forming apparatus 1 according to the first embodiment.

In addition, the control section 100 of the image forming apparatus 1 performs the following operation.

The paper P on which the toner image is formed of the capsule-type decoloring toner is set in the feeding cassette device 20 to be reused after the toner image is decolored and utilization thereof is completed. The user performs the operation for decoloring the image. The paper P on which the image is formed may be set in the specific cassette device 20 or in a manual device.

In ACT01, the user sets the condition of a decoloring mode using the control panel 140.

Figure 6:
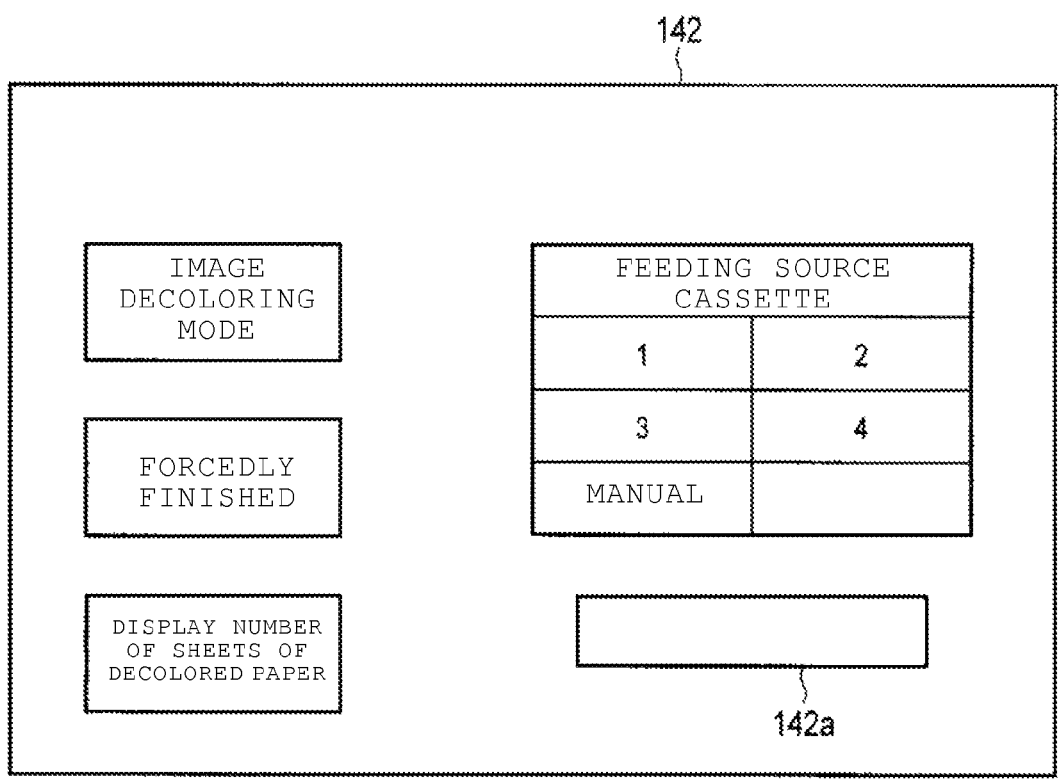
FIG. 6 illustrates an image operation screen displayed on the control panel in the image forming apparatus according to the first embodiment.

FIG. 6 illustrates an image decoloring operation screen 142 displayed on the control panel 140 of the image forming apparatus according to the first embodiment.

The user presses the image decoloring mode button on the image decoloring operation screen 142 and designates, as a feeding source cassette, one of the cassettes 1 to 4 or the manual device in which the paper P for reuse is stored. Herein, the feeding source cassette is not limited to one and a plurality of cassettes can be designated. The user sets the number of sheets to be decolored. When the user inputs a number using the keyboard 170*d*, the number is displayed on a number setting section 142*a*.

Then, when the user presses a start button provided in the operation section 170 of the control panel 140, the decoloring mode (the decoloring operation) is set in ACT02. In addition, the image decoloring operation screen 142 is not limited to the above format and may incorporate the operation buttons for decoloring the image on the operation screen. Furthermore, the paper P for reuse may be taken out from one of the cassettes without designating a specific cassette.

In ACT03, the heating of the fixing roller 27 is started. In the first embodiment, the image forming operation is performed using either the decoloring toner or a (not decoloring) normal toner in the image forming apparatus 1. Accordingly, in a printing mode (the printing operation), the temperature of the fixing roller needs to be at 100° C. or less. For example, a setting temperature is 80° C. and is controlled so that the temperature of the toner image does not become 90° C. or more, which is a decoloring temperature.

Then, in ACT04, the fixing roller is heated to 140° C. or more so that the decoloring toner is decolored. Then, when the temperature of the fixing roller is 140° C. or more (YES in ACT04), the decoloring operation is performed in ACT05.

In the image decoloring mode, the photoconductive drum 11 is driven in the direction of the arrow S at the circumferential velocity of 21 mm/sec (a second paper transportation velocity). In the image decoloring mode, the electrostatic latent image corresponding to the image data is not formed on the photoconductive drum 11 by the laser exposure device 13. In other words, the paper P is transported to the fixing device 26 via the same route as in the above-described image formation.

In the image decoloring mode, the fixing device 26 transports the paper at 21 mm/sec (the second paper transportation velocity) while heating/pressing the paper. At this time, the temperature of the surface of the fixing roller 27 is evenly 140° C. The toner image on the paper is heated to 90° C. or more by heating the paper while the paper is conveyed at the transportation velocity which is slower than that of the image formation process, and the image is decolored due to the instantly decolorable property of the capsule-type decoloring toner.

In ACT06, whether or not a request of a new job related to the operation of the image forming apparatus is received is checked at an appropriate timing during the decoloring operation. When there is no request of a new job (NO in ACT06), the process (to be described below) of ACT08 is performed. When there is a request of a new job (YES in ACT06), operation corresponding to the job is performed.

In the image forming apparatus 1 according to this embodiment, an operation that cannot be performed at the same time as the image decoloring operation is not performed, and the image forming apparatus 1 goes into a standby state. On the other hand, an operation that can be performed at the same time as the image decoloring operation is performed.

Herein, jobs for which the image forming apparatus performs operation includes, for example, a FAX receiving job via a public line, a printing job via a network, a scanning job, a copying job, a FAX transmitting job, or the like by the operation of the control panel 140.

When a requested job includes the printing operation (the image formation on the medium, the fixing operation, or the like), interruption of the currently-performed job is prohibited and the requested job is treated as a reserved job. When the requested job does not include the printing operation, the interruption of the currently-performed job is allowed and the requested job is performed.

In the example described above, the printing job via the network and the copying job by operation of the control panel 140 are interrupt-prohibition jobs. The FAX receiving job via the public line, the scanning job by operation of the control panel 140, and the FAX transmitting job are interrupt-allowance jobs.

The control panel 140 has an interrupt button 170f to allow the interruption of the copying operation during printing or the like. However, the decoloring operation is not interrupted even if the interrupt button 170f is pressed down during the decoloring operation.

In ACT17, it is checked whether or not the job is an interrupt-prohibition job. When the job is the interrupt-prohibition job (YES in ACT17), the job is reserved in a waiting line to be performed later in ACT07 because the image decoloring operation is currently performed. When the job is not the interrupt-prohibition job (NO in ACT17), the job is performed without waiting for the decoloring operation being completed.

In ACT08, it is checked whether or not the decoloring mode is finished. For example, when the designated number of sheets are decolored, the decoloring mode is finished. In addition, when there is no medium in the designated feeding source cassette (when the cassette is empty), the decoloring mode is finished even when the designated number of sheets have not been decolored.

When no condition to finish the decoloring mode is met (NO in ACT08), the process returns to ACT05 and the decoloring operation is performed again. When the condition to finish the decoloring mode is satisfied (YES in ACT08), the decoloring mode is finished in ACT09. In ACT10, the heating of the fixing roller 27 is stopped.

In ACT11, it is checked whether or not the toner to be used in the image forming apparatus 1 is the decoloring toner. The image forming apparatus 1 may automatically determine whether or not the decoloring toner is to be used by reading, for example, the information (for example, whether the stored toner is the decoloring toner or not, the decoloring temperature and the like) related to the toner from a tag attached to the toner cassette to be used. In addition, the user may manually set a type of toner on the control panel 140. In addition, when it is not clear whether or not the decoloring toner is to be used, it may be determined that the decoloring toner is to be used.

When the decoloring toner is to be used in the next operation (YES in ACT11), the next operation stays on standby until the temperature of the fixing roller becomes 100° C. or less in ACT12. Then, when the temperature of the fixing roller becomes 100° C. or less (YES in ACT12), it can be determined that the heating temperature in the fixing device 26 is lower than a temperature at which the decoloring toner is decolored. In ACT13, the printing mode is set to perform the next operation.

On the other hand, when the decoloring toner is not to be used (NO in ACT11), the printing mode is set in ACT13 without waiting until the temperature of the fixing roller becomes 100° C. or less.

In ACT14, the performance of the reserved job is started.

In addition, the image forming apparatus 1 may automatically determine the temperature by reading the information (for example, information related to whether or not the toner is the decoloring toner, the decoloring temperature of the toner, and the like) related to the toner from the tag attached to the toner cassette. Whether or not the operation that is on standby can be performed next is determined based on the temperature. In addition, the user may manually set the temperature on the control panel 140.

As described above, in the first embodiment, when there is a new job request during the image decoloring mode, the performance thereof stays on standby by recognizing the new job as a reserved job if operation of the new job cannot be performed at the same time as the image decoloring operation. After the image decoloring mode is finished and the mode is in a printable state, the new job is performed. On the other hand, if operation of the new job can be performed at the same time as the image decoloring operation, operation of the new job is performed when the request thereof is received.

In addition, the image decoloring screen 142 described above has a forced finishing button to force finishing of the image decoloring mode. When the forced finishing button is operated, the image decoloring mode is finished to return to a predetermined mode (a normal printing mode, a ready mode, an energy saving mode, or the like) that is different from the image decoloring mode. Even in this case, when there is a reserved job during the image decoloring mode, the job is performed after returning to the predetermined mode.

In the embodiment described above, the fixing roller 27 is heated. In addition, the pressing roller 28 may be also heated at the same time. The paper P is set in the feeding cassette device 20 so that the surface of the paper P on which the decoloring toner is printed comes in contact with the fixing roller 27. However, the present disclosure is not limited to this embodiment, and the paper P may be set in the feeding cassette device 20 so that a surface of the paper P opposite to the surface on which the decoloring toner is printed may come in contact with the fixing roller 27. There may be an image decoloring mode independent of how the paper is put into the feeding cassette device 20 by appropriately selecting the heating conditions such as the presence or absence of the heating of the fixing roller 27 and the pressing roller 28 and the heating temperature, the condition of the second paper transportation velocity, the thickness, and the type of the paper.

(Second Embodiment)

A second embodiment is different from the first embodiment in that the degree of environmental conservation, which is obtained by using the reused paper in the image forming apparatus, is shown (visualized) to the user. The same reference numbers are assigned to the same sections as the first embodiment and detailed description thereof is omitted.

Figure 7:
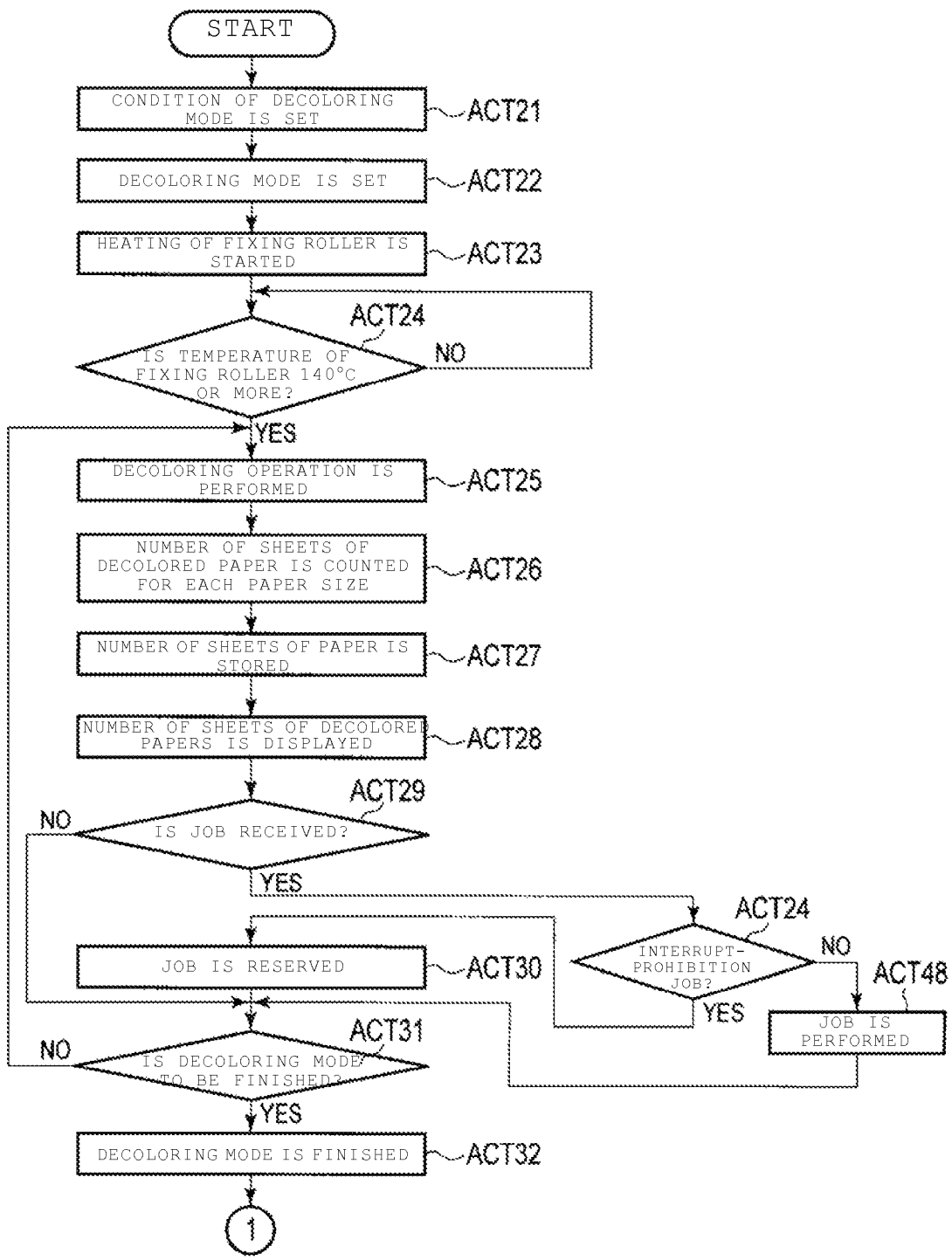
FIG. 7 is a flowchart illustrating the image decoloring operation performed by an image forming apparatus according to a second embodiment.
Figure 8:
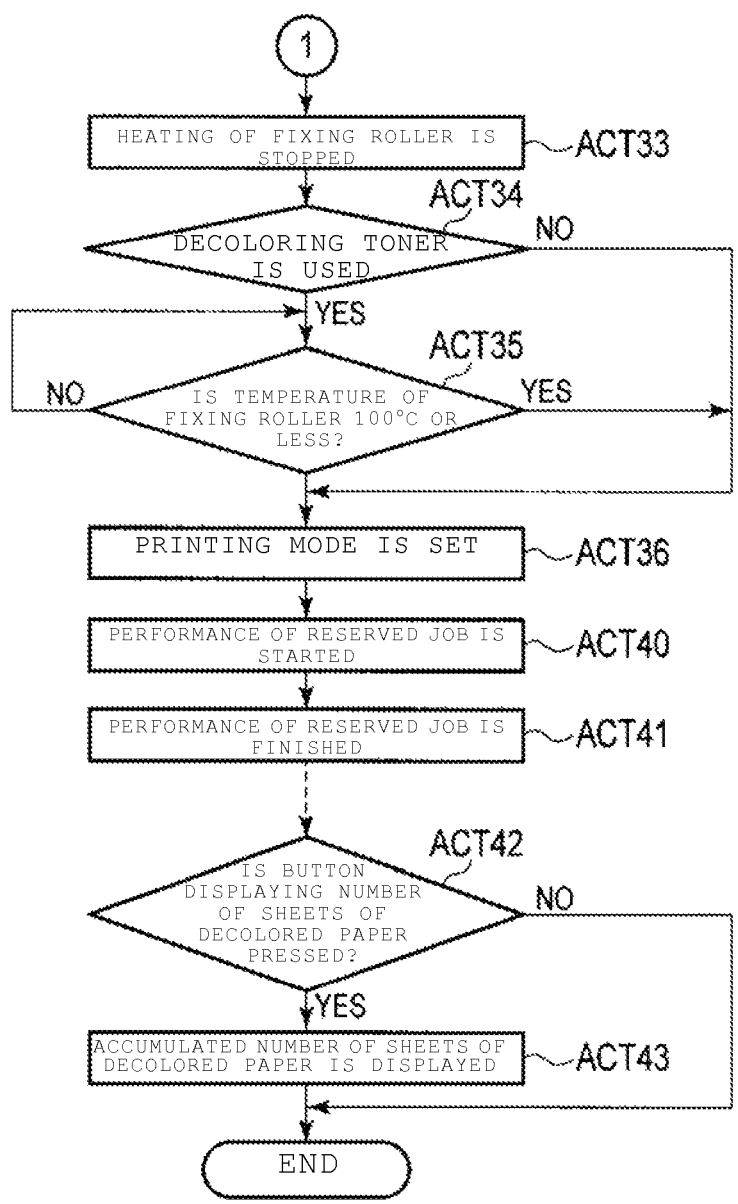
FIG. 8 is a flowchart illustrating the image decoloring operation performed by the image forming apparatus according to the second embodiment.

FIGS. 7 and 8 are flowcharts illustrating the image decoloring operation performed by the image forming apparatus laccording to the second embodiment.

In ACT21, the user sets the condition of a decoloring mode with the control panel 140. The user presses the image decoloring mode button on the image decoloring operation screen 142 illustrated in FIG. 6 and designates, as the feeding source cassette, one of the cassettes 1 to 4 or the manual device in which the paper P for reuse is stored. Herein, the feeding source cassette is not limited to one and a plurality of cassettes can be designated. Then, when the user presses a start button provided in the operation section 170 of the control panel 140, the decoloring mode (the decoloring operation) is set in ACT22.

In ACT23, the heating of the fixing roller 27 is started. In ACT24, the fixing roller is heated to 140° C. or more so that the decoloring toner is decolored. Then, when the temperature of the fixing roller is 140° C. or more (YES in ACT24), the decoloring operation is performed in ACT25. Since the decoloring operation is the same as in the first embodiment, detailed description thereof is omitted.

In ACT26, the number of sheets of the decolored paper is counted with respect to each paper size. In ACT27, the counted number is stored in a memory. Then, in ACT28, the counted number according to the decoloring operation is displayed.

Figure 9:
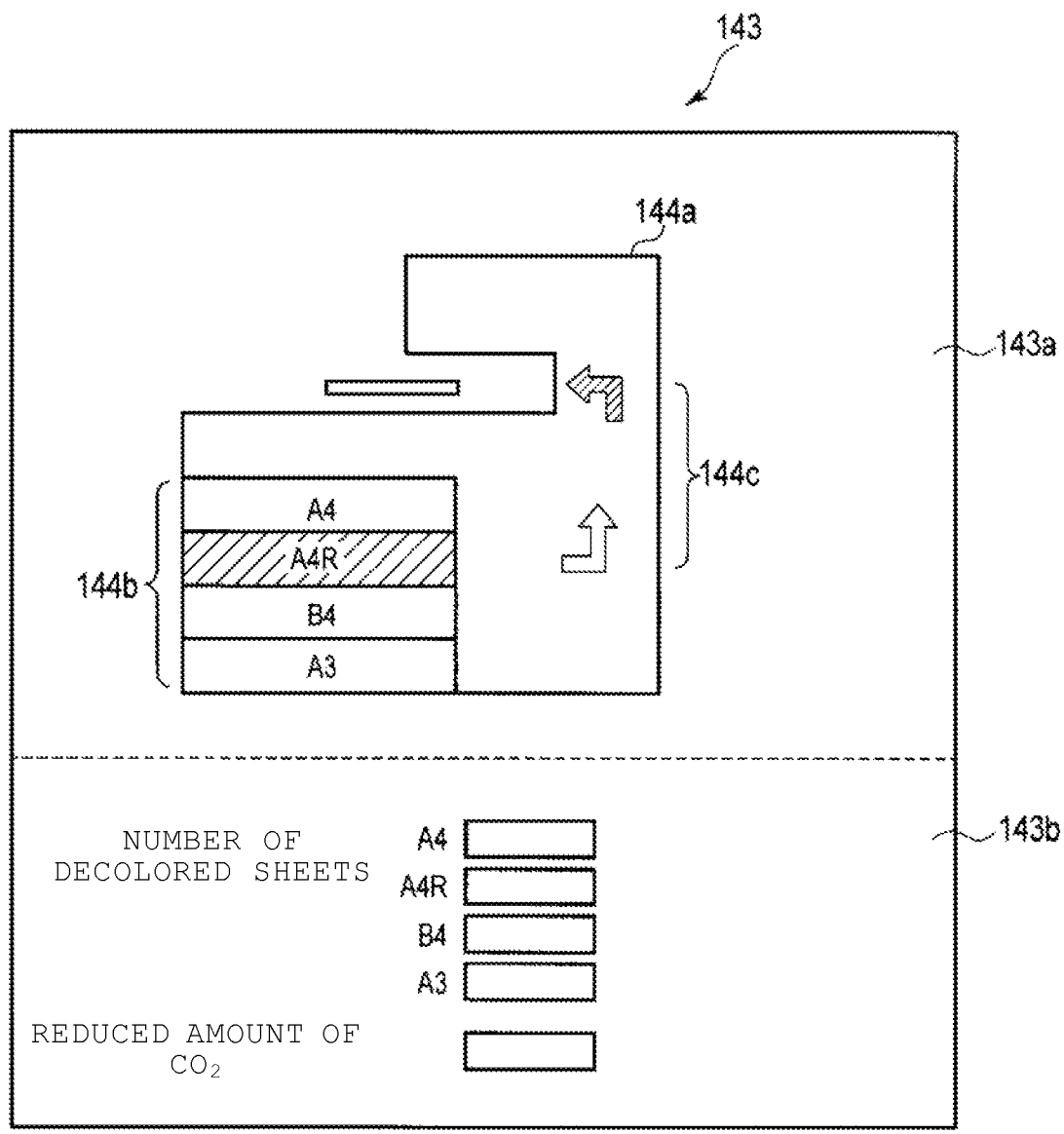
FIG. 9 illustrates a decoloring state display screen displayed on the control panel of the image forming apparatus according to the second embodiment.

FIG. 9 illustrates a decoloring situation display screen 143 in the image forming apparatus according to the second embodiment.

The decoloring situation display screen 143 has an image display area 143a and an information display area 143b. 144a refers to the image forming apparatus 1, 144b refers to the cassettes, and 144c refers to arrows, in the image display area 143a. The size of the paper stored in each cassette is displayed and the cassette currently used is represented by changing the color in the cassettes 144b. Then, the present position (the cassette→the image forming section→the fixing device→the discharging section) of the paper taken out from the cassette is tracked and displayed in real time by the arrows 144c.

A number of the decolored sheets and an amount of $CO_2$ saved by the decoloring are displayed according to the decoloring operation described above in real time in the information display area 143b. The number of the decolored sheets is a number of decolored sheets after the job is started. The amount of saved $CO_2$ is expressed by the following equation (1).

(Saved amount of $CO_2$)=(Amount of $CO_2$ saved per each decolored sheet)×(Number of decolored sheets).

(Amount of $CO_2$ saved per each decolored sheet)= (Amount of $CO_2$ used to produce one sheet of paper)−(Energy(Amount of $CO_2$) used to decolor one sheet of paper)   Equation (1)

In ACT29 of FIG. 7, whether or not a request for a new job related to the operation of the image forming apparatus is received is checked at an appropriate timing during the decoloring operation. When there is no request for a new job (NO in ACT29), the process (to be described below) of the ACT31 is performed. When there is a request for a new job (YES in ACT29), operation corresponding to the job is performed.

In ACT47, it is checked whether or not the job is an interrupt-prohibition job. When the job is the interrupt-prohibition job (YES in ACT47), the job is reserved in a waiting line to be performed later in ACT30 because the image decoloring operation is currently performed. When the job is not the interrupt-prohibition job (NO in ACT47), the job is performed without waiting for the decoloring operation to be completed.

In ACT31, it is checked whether or not the decoloring mode is finished. When no condition to finish the decoloring mode is satisfied (NO in ACT31), the process returns to ACT25 and the decoloring operation is performed again. When the condition to finish the decoloring mode is satisfied (YES in ACT31), the decoloring mode is finished in ACT32. In ACT33, the heating of the fixing roller 27 is stopped.

In ACT34, it is checked whether or not the toner which is used in the image forming apparatus 1 is the decoloring toner. The image forming apparatus 1 may automatically determine whether or not the decoloring toner is to be used by reading, for example, the information of the tag attached to the toner cassette. In addition, the user may manually set a type of the toner on the control panel 140. In addition, when it is not clear whether or not the decoloring toner is to be used, it may be determined that the decoloring toner is to be used.

When the decoloring toner is to be used (YES in ACT34), the next operation stays on standby until the temperature of the fixing roller becomes 100° C. or less in ACT35. Then, when the temperature of the fixing roller becomes 100° C. or less (YES in ACT35), it can be determined that the heating temperature in the fixing device 26 is lower than a temperature at which the decoloring toner is decolored. In ACT36, the printing mode is set to perform the next operation.

On the other hand, when the decoloring toner is not to be used (NO in ACT34), the printing mode is set in ACT36 without waiting until the temperature of the fixing roller becomes 100° C. or less.

In ACT40, the performance of the reserved job is started. In ACT41, the performance of the reservation job is finished.

When the user presses the button for displaying the number of decolored sheets (YES in ACT42) on the image decoloring operation screen 142 illustrated in FIG. 6 after the printing mode of the ACT36 is set, an accumulated number of decolored sheets is displayed on the control panel 140 in ACT43. The accumulated number of decolored sheets is a number decolored sheets counted from an initial time point which is set arbitrarily by the user to the present time point.

Furthermore, the decoloring situation display screen 143 is not limited to the embodiment described above. The number of decolored sheets can be counted with respect to each standard paper size, and the accumulated number of decolored sheets with respect to each standard paper size can be displayed. The saved amount of $CO_2$ by the decoloring can be displayed.

As described above, according to the second embodiment, the user can be motivated to preserve the environment by visual information. In addition, the user can be motivated to preserve the environment by receiving rewards based on the number of decolored sheets, the saved amount of $CO_2$, or the like.

(Third Embodiment)

A third embodiment is different from the first embodiment in that the paper does not pass through the photoconductive drum 11 in the image decoloring mode. The same reference numbers are assigned to the same sections as the first embodiment and detailed description thereof is omitted.

The decoloring operation of the third embodiment is described with reference to FIG. 2.

When the toner image formed of the capsule-type decoloring toner is decolored, the paper P is set in the feeding section (not illustrated). When start of the image decoloring mode is input, the paper P is supplied to a paper path P2 without passing through the photoconductive drum 11. The paper P moves along the paper path P2 and is guided to the fixing device 26 by switching a gate 41. The transportation velocity thereof is 21 mm/sec (the second paper transportation velocity), which is different from 215 mm/sec (the first paper transportation velocity) at which the paper is conveyed when the image is formed. In addition, the fixing device 26 also transports the paper while heating and pressing the paper and fixing the image on the paper at 21 mm/sec (the second paper transportation velocity).

The toner image formed on the paper P is heated by the fixing device 26. The link of the coloring matter and the color former is cut by the heating, and the image is changed from a colored state to a decolored state. The image decoloring is completed by decoloring the color of the capsule-type toner image. The paper P, the image on which is decolored, is discharged in a predetermined direction by the discharge roller 32 disposed downstream with respect to the fixing device 26 in the transportation direction of the paper P. When the paper is set in the feeding cassette device 20, the paper can be reused for the image formation.

In addition, the operation conditions of the fixing device 26 are the same as the operation conditions for the image decoloring in the first embodiment. In addition, similar to the first embodiment, when the new jobs of FAX, Print, and Copy are received during the image decoloring mode, a sequence is employed in which printing of the job received during the image decoloring mode is started after the image decoloring mode is finished (when there is no more paper to be decolored). Thus, the new jobs are performed in the printable state without interrupting the image decoloring mode.

(Fourth Embodiment)

In a fourth embodiment, the amount of the color material of the capsule-type decoloring toner is different from that of the first embodiment. The same reference numbers are assigned to the same sections as the first embodiment, and detailed description thereof is omitted.

In the fourth embodiment, the capsule-type decoloring toner is manufactured so that 30 wt % of the toner, excluding the external additive, consists of the capsulated color material. The test with the same content as that described in the first embodiment was performed using the capsule-type decoloring toner of which the amount of the color material was different from that of the first embodiment.

On the fixed image obtained, the image density was high and the visibility was excellent. However, the color of the capsule itself remained colored in the image, after the color of the toner image was decolored by performing the image decoloring operation described in the first embodiment. The image density after decoloring was 0.2 and background noise was barely acceptable to reuse the paper. Accordingly, it is preferable that the ratio of the color material with respect to the entire capsule-type decoloring toner be 30 wt % or less to effectively decolor the image.

According to the first embodiment, in order to ensure the visibility of the image, it is preferable that the ratio of the color material with respect to the entire capsule-type decoloring toner be 10 wt % or more. According to the fourth embodiment, in order to effectively achieve the function of the decoloring, it is preferable that the ratio of the color material with respect to the entire capsule-type decoloring toner be 30 wt % or less. Accordingly, a preferable ratio of the color material with respect to the capsule-type decoloring toner is considered to be higher than 10 wt % and lower than 30 wt %.

(Fifth Embodiment)

A fifth embodiment is different from the first embodiment in that even when the decoloring operation is performed, the paper is transported at the same transportation velocity as the velocity in the image formation. The same reference numbers are assigned to the same sections as the first embodiment, and detailed description thereof is omitted.

In the fifth embodiment, the capsule-type decoloring toner is manufactured so that 30 wt % of the toner, excluding the external additive, consists of the capsulated color material. After the toner image formed by the capsule-type decoloring toner is decolored, the paper P is set in the feeding cassette device 20. When start of the image decoloring mode is input, the photoconductive drum 11 of the image forming section 10 is driven in the direction of the arrow S at the circumferential velocity of 215 mm/sec (i.e., the first paper transportation velocity as in the image formation).

In the image decoloring mode, the electrostatic latent image corresponding to the image data is not formed on the photoconductive drum 11 by the laser exposure device 13. The paper P is transported to the fixing device 26 employing the same process as in the image formation described above and therefore at the circumferential velocity of 215 mm/sec (the first paper transportation velocity). In the image decoloring mode, the fixing device 26 transports the paper while heating/pressing the paper and fixing the image formed on the paper at 190° C. (a second fixing temperature), which is higher than the fixing temperature of the first embodiment. Under this condition, the toner image on the paper is heated to 90° C. or more and the paper P can be decolored due to the instantly decolorable property of the capsule-type decoloring toner.

However, when an interval between the sheets, which are transported in the image decoloring mode, is approximately 80 mm, which is the same as the interval in the image formation, the discharged sheets stuck with each other due to the toner formed on the sheets. Since the temperature of sheets immediately after being discharged is high, the toner resin is relatively soft and sticks to a rear surface of another sheets. As a result of performing a test while changing values of paper intervals, when the interval between two sheets was approximately 400 mm in the image decoloring mode, the discharged sheets did not stick to each other even though the decoloring was continuously performed on 100 sheets. This is because the next paper is discharged in a state where the discharged paper is cooled down.

For this reason, the sticking of sheets can be prevented by setting an interval of time with which two sheets are supplied to the fixing device 26 to approximately 2 seconds (≅400/215 sec) or longer.

(Sixth Embodiment)

A configuration of a fixing device of an image forming apparatus according to the sixth embodiment is different from that of the first embodiment. Accordingly, the same reference numbers are assigned to the same sections as the first embodiment, and detailed description thereof is omitted.

Figure 10:
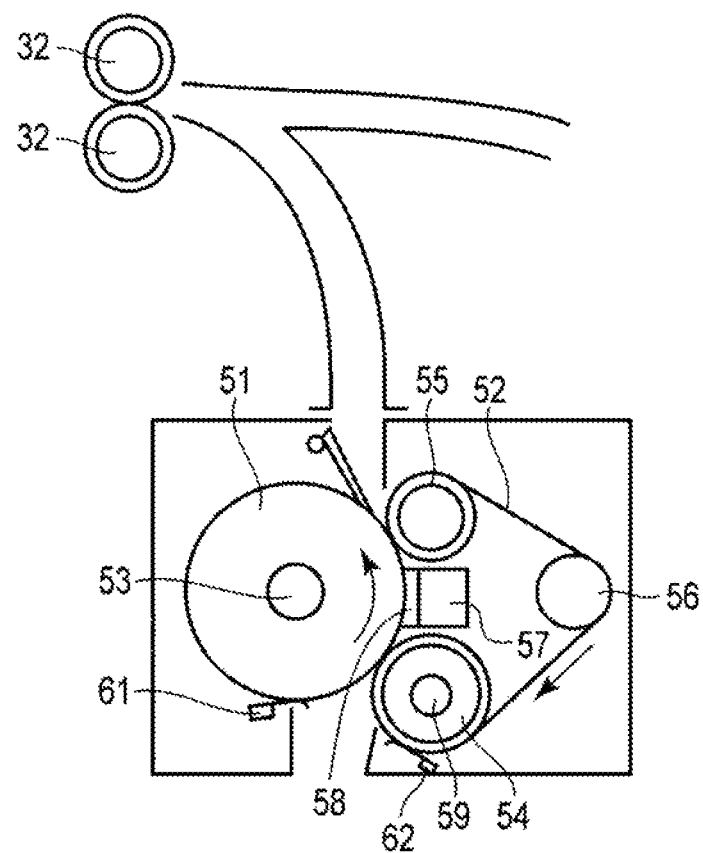
FIG. 10 illustrates a configuration of the fixing device included in an image forming apparatus according to a sixth embodiment.

FIG. 10 illustrates a configuration of the fixing device 26 of the image forming apparatus 1 according to the sixth embodiment.

The fixing device 26 has a heating roller 51 that is a fixing member which is cylindrically formed and a pressing belt 52 that is a pressing member which is endlessly rotated. The pressing belt 52 is in contact with an outer peripheral surface of the heating roller 51 in a predetermined range and forms a fixing nip section. The heating roller 51 has a heating roller lamp 53, which is formed of a halogen lamp, inside thereof as a heating source.

The pressing belt 52 is wound and stretched around a belt heating roller 54 which is positioned upstream in the transportation direction with respect to a pressing roller 55, the pressing roller 55 which is positioned downstream in the transportation direction with respect to the belt heating roller 54, and a tension roller 56. The fixing nip section is formed between the belt heating roller 54 and the pressing roller 55. As the pressing belt 52 is conveyed between the pressing roller 55 and the heating roller 51, the pressing belt 52 presses and come in contact with the heating roller 51. Thus, an outlet of the fixing nip section is formed between the pressing roller 55 and the heating roller 51. In addition, a pressing pad holder 57 disposed inside the pressing belt 52 holds a pressing pad 58. The pressing belt 52 presses the pressing belt 52, and the pressing belt 52 comes in contact with the heating roller 51 as the pressing pad 58 pushes an inner peripheral surface of the pressing belt 52 at a center portion of the fixing nip section.

The belt heating roller 54 is formed in a hollow roller shape and has a pressing belt lamp 59 which employs the halogen lamp as the heating source.

A temperature of A surface of the heating roller 51 is detected by a fixing member thermistor 61, which is in contact with the outer peripheral surface thereof. A temperature of the surface of the pressing belt 52 is detected by a pressing member thermistor 62, which is in contact with the outer peripheral surface of the belt heating roller 54.

Figure 11:
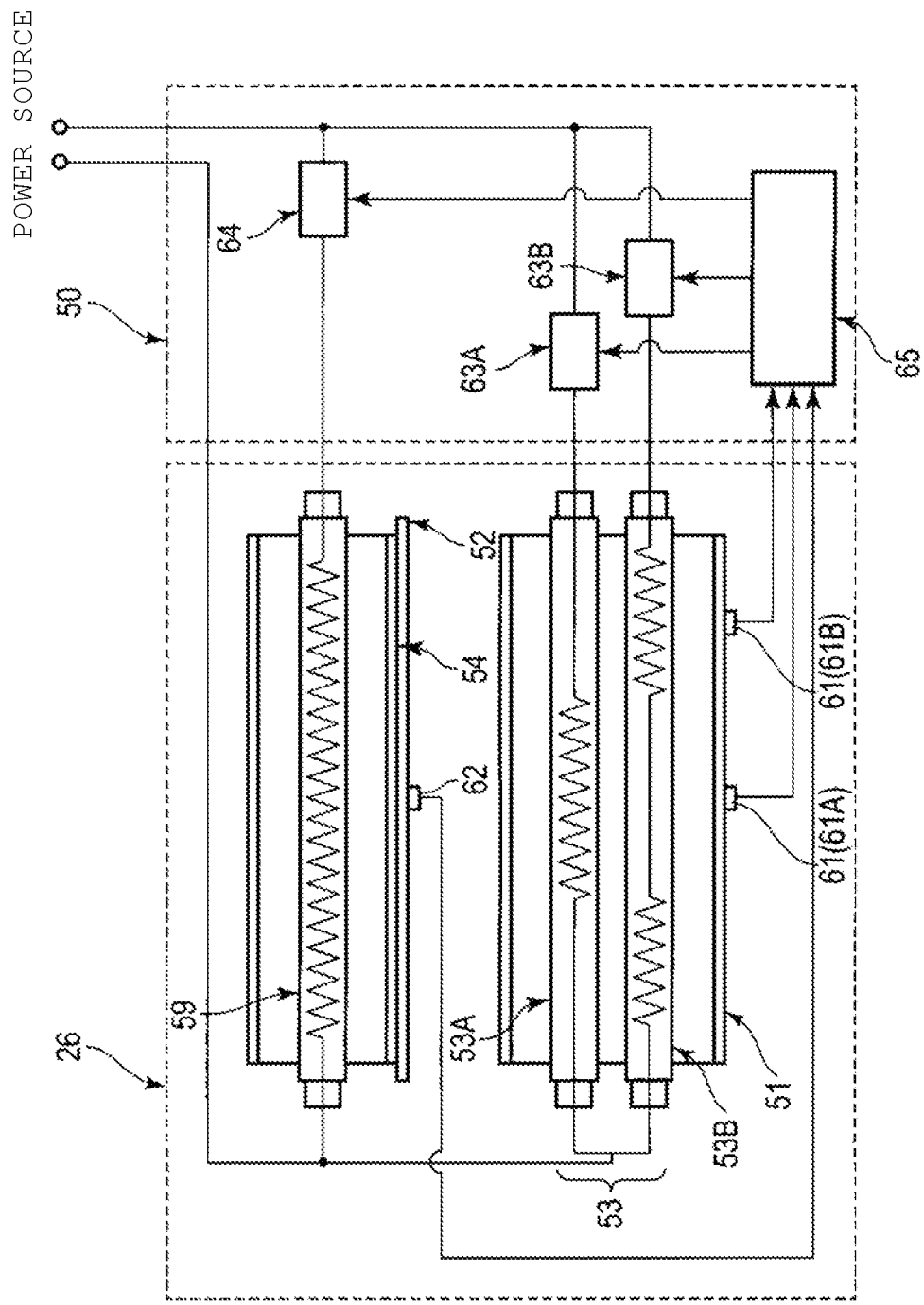
FIG. 11 illustrates a heating mechanism of the fixing device of the image forming apparatus according to the sixth embodiment.

FIG. 11 illustrates a configuration of the heating mechanism of the fixing device 26 of the image forming apparatus 1 according to the sixth embodiment. The heating mechanism inside the fixing device 26 and a power control section 50 which controls a power supplied to the heating mechanism are illustrated in FIG. 11.

The halogen lamp 53, which is disposed in the heating roller 51, has both of a heating roller center lamp 53A, which heats a center portion of the heating roller 51 in a longitudinal direction thereof, and a heating roller side lamp 53B, which heats both ends of the heating roller 51 in the longitudinal direction thereof. In addition, the pressing belt lamp 59 which is disposed in the belt heating roller 54 heats the belt heating roller 54 throughout the entire length thereof in the longitudinal direction.

The heating roller center lamp 53A, the heating roller side lamp 53B, and the pressing belt lamp 59 are electrically connected to a center lamp switching element 63A, a side lamp switching element 63B, and a pressing belt lamp switching element 64, respectively. A temperature controller 65 controls the temperature by controlling ON/OFF of the switching elements individually and by performing supply/stop of an electric power from a commercial AC power source. In addition, the switching elements can use, for example, a bidirectional thyristor.

The fixing member thermistor 61 has a heating roller center thermistor 61A, which detects the temperature of the surface of the center portion of the heating roller 51 in the longitudinal direction thereof, and a heating roller side thermistor 61B, which detects the temperature of the surface of one end of the heating roller 51 in the longitudinal direction thereof. Temperature detection information of the heating roller center thermistor 61A and the heating roller side thermistor 61B is input into the temperature controller 65. In addition, the pressing member thermistor 62 detects the temperature of the surface of the center portion of the pressing belt 52 in a width direction thereof. The temperature detection information thereof is input into the temperature controller 65.

The temperature controller 65 performs the temperature control by controlling ON/OFF of each lamp, based on the temperature detection information of each of the thermistors 61A, 61B, and 62. In addition, the temperature controller 65 includes a ROM (not illustrated) in which a program for performing the temperature control is stored and a RAM (not illustrated) in which control parameters of the temperature control are stored.

(Seventh Embodiment)

A configuration of an image forming apparatus according to a seventh embodiment is different from that of the first embodiment. Accordingly, the same reference numbers are assigned to the same sections as the first embodiment, and detailed description thereof is omitted.

Figure 12:
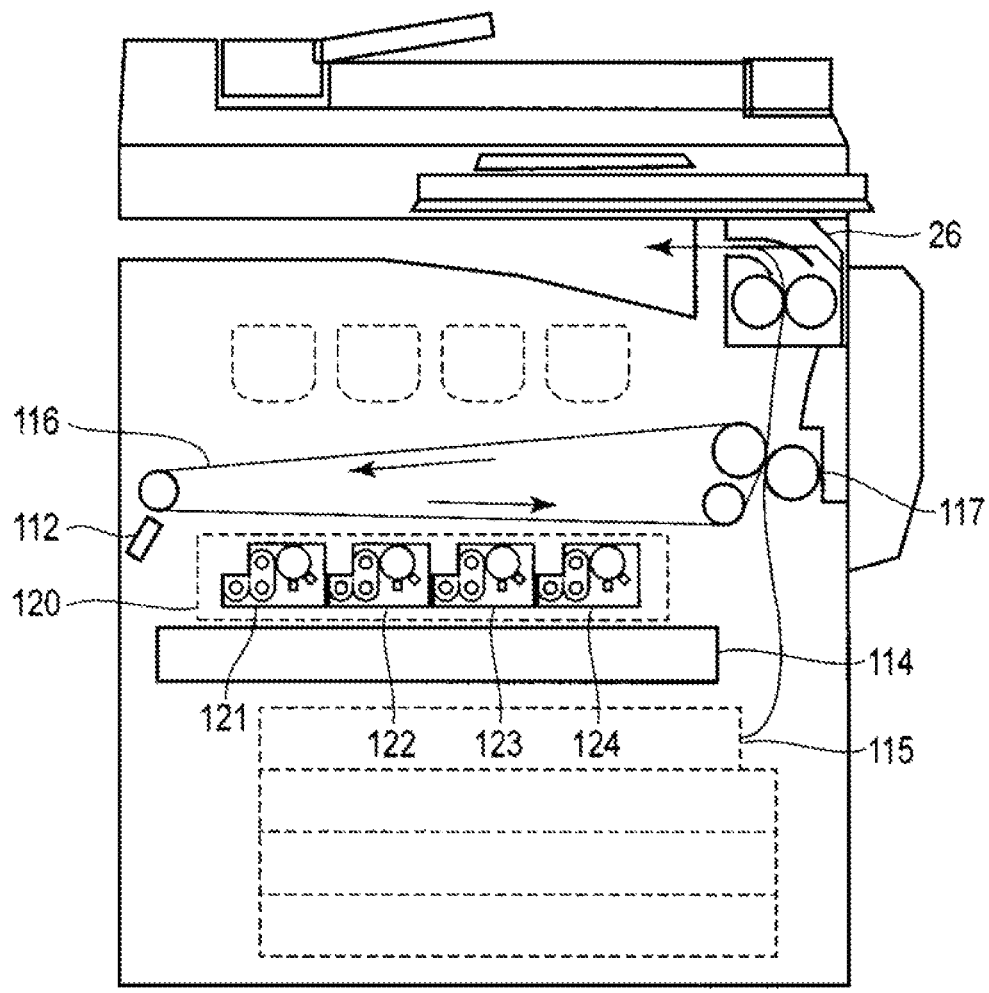
FIG. 12 is a schematic view of an image forming apparatus according to a seventh embodiment.

FIG. 12 is a schematic view of the image forming apparatus according to the seventh embodiment. The image forming apparatus 1 uses a plural series of tandem processes. The image forming apparatus 1 includes a plural series of tandem process 120, a blade 112 (a toner removing stage), a control device 114, a feeding device 115, a primary transfer belt 116, a secondary transfer roller 117, and the fixing device 26. In addition, the plural series of tandem process 120 has four process units 121, 122, 123, and 124.

In addition, the process units 121, 122, 123, and 124 use a yellow (Y) toner, a magenta (M) toner, a cyan (C) toner and, the decoloring toner, respectively. In other words, in the seventh embodiment, the toner can be used by switching between the decoloring toner and non-decoloring toner without replacing the toner cassette.

Figure 13:
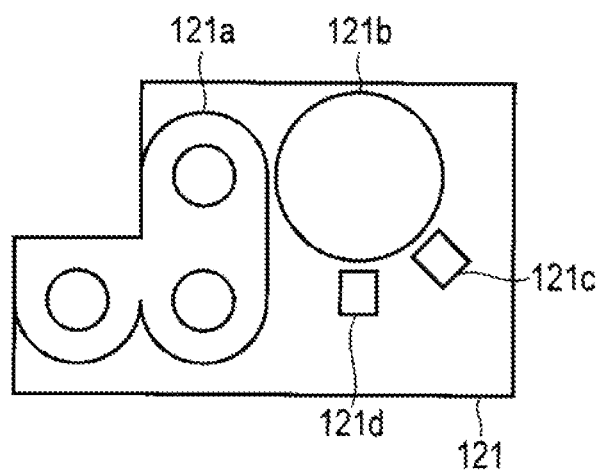
FIG. 13 illustrates an example of a process unit of the image forming apparatus according to the seventh embodiment.

FIG. 13 illustrates an example of a configuration of the process unit 121 of the image forming apparatus according to the seventh embodiment. The process unit 121 includes a developing device 121a, a photoconductive drum 121b, an electric charger 121c, and an exposure device 121d.

In the process unit 121, the photoconductive drum 121b (an image carrier) is charged at a predetermined potential by the electric charger 121c and the laser beams of which intensity is modulated in accordance with the image data by the exposure device 121d are irradiated onto the photoconductive drum 121b. Accordingly, the electrostatic latent image corresponding to the image to be output is formed on the photoconductive drum 121b. The electrostatic latent image formed on the photoconductive drum 121b is developed by selectively supplying the toner by a magnetic brush of the developing device 121a. The toner on the photoconductive drum 121b, which is developed, is transferred to the primary transfer belt 116 by an electric field. In addition, the process unit 121 is a cleaner-less type; however, the process unit 121 is not limited to this type and may include the cleaner. The configuration and the operation of other process units 122, 123, and 124 are also the same as the process unit 121.

In the image forming apparatus 1 illustrated in FIG. 12, each color toner is transferred to the primary transfer belt 116 in an image formation process by the process units 121, 122, 123, and 124. After that, the paper is discharged from the image forming apparatus 1 after the feeding process, the secondary transferring process performed by the secondary transfer roller 117, and the fixing process performed by the fixing device 26.

Figure 14:
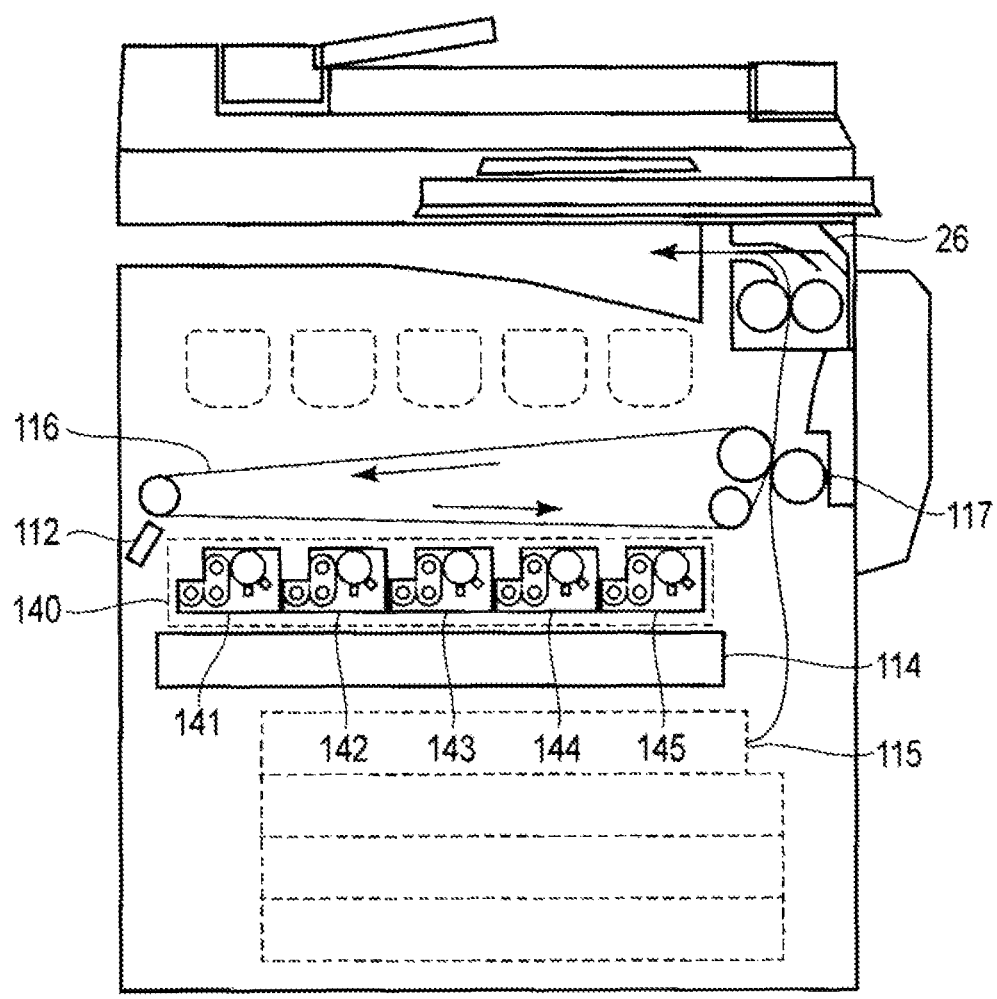
FIG. 14 is a schematic view of an image forming apparatus according to the seventh embodiment.

In addition, the image forming apparatus 1 is not limited to the configuration illustrated in FIG. 12 and may have a configuration illustrated in FIG. 14. The image forming apparatus 1 illustrated in FIG. 14 includes a plural series of tandem process 140 instead of the plural series of tandem process 120. Then, the plural series of tandem process 140 includes, for example, a process unit 141 using the decoloring toner and process units 142, 143, 144, and 145 using the non-decoloring toner of four colors (Y, M, C and K).

As described above, the image forming apparatus of each embodiment is described. The paper transportation velocity is slower or the fixing temperature is higher in the image decoloring mode compared to in the image formation mode. The image decoloring mode is operated under operation condition of the second paper transportation velocity or the second fixing temperature which are determined in advance. However, the operation conditions in the image decoloring mode may be adjusted according to the medium to be used (the type and the thickness), physical properties of the toner to be used, or the like.

Then, for example, the operation conditions in the image decoloring mode may be adjusted based on detection of the characteristics (the type and the thickness) of the medium to be used and the physical properties (the decoloring performance) of the toner to be used or on setting input of the user. At this time, an operation method to be described below can be appropriately combined according to the operation conditions.

(1) In the image decoloring mode, the paper transportation velocity is set to the second transportation velocity, which is lower than that in the image formation mode, in a transportation control system.

(2) In the image decoloring mode, the fixing temperature is set to the second fixing temperature, which is higher than that in the image formation mode, in a fixing device.

(3) In the image decoloring mode, the paper transportation velocity is set to the second transportation velocity, which is lower than that in the image formation mode, in the transportation control system, and the fixing temperature is set to the second fixing temperature in the fixing device.

In addition, in each embodiment described above, the thermal decolorable toner is used as the thermal decolorable recording material; however, the present disclosure is not limited to such an embodiment and a thermal decolorable ink may be used.

In addition, each function described in the above embodiments may be achieved with a hardware or may be achieved by reading with a computer a program. Thus, each function may be achieved by either one of the software and the hardware.

Furthermore, each function can be achieved by reading with a computer the program stored in a recording medium (not illustrated). Herein, the recording medium in the embodiment may have any type of recording formats if the recording medium can store the program and is a computer readable recording medium.

In addition, the present disclosure is not limited to the embodiments described above and can be embodied by modifying the configuration elements without departing from the spirit of the embodiment in an implementation phase.

Various embodiments can be formed by appropriately combining a plurality of configuration elements disclosed in the exemplary embodiments described above. For example, some configuration elements may be deleted from all configuration elements illustrated in the exemplary embodiments. Furthermore, configuration elements from different embodiments may be appropriately combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a heating unit configured to heat an image formed on a sheet; and
   a control unit configured to control a temperature of the heating unit to be (i) above a first temperature when performing an image erasing operation on a first sheet supplied thereto, and (ii) below a second temperature that is lower than the first temperature when performing an image fixing operation on a second sheet supplied thereto,
   the control unit being configured to permit a first type of job to interrupt a currently-executing job while the image erasing operation is being performed and prohibit a second type of job from interrupting the currently-executing job while the image erasing operation is being performed.

2. The image processing apparatus according to claim 1, wherein the first type of job does not require image fixing.

3. The image processing apparatus according to claim 2, wherein the first type of job is a scanning job.

4. The image processing apparatus according to claim 3, further comprising:
   a scanning unit configured to scan an image formed on a sheet,
   wherein the scanning unit is configured to scan the image while the temperature of the heating unit is controlled to be higher than the first temperature.

5. The image processing apparatus according to claim 2, wherein the first type of job is a fax job.

6. The image processing apparatus according to claim 5, further comprising:
   a faxing unit configured to transmit and receive data through a network,
   wherein the faxing unit is configured to transmit or receive the data while the temperature of the heating unit is controlled to be higher than the first temperature.

7. The image processing apparatus according to claim 1, wherein the second type of job requires image fixing.

8. The image processing apparatus according to claim 1, wherein the first sheet is supplied to the heating unit at a first speed that is slower than a second speed at which the second sheet is supplied to the heating unit.

9. The image processing apparatus according to claim 1, wherein the control unit is configured to cause a first interval to be formed between two of the first sheets supplied to the heating unit, and a second interval to be formed between two of the second sheets supplied to the heating unit, the first interval being longer than the second interval.

10. An image processing apparatus comprising:
a heating unit configured to heat an image formed on a sheet; and
a control unit configured to control a speed of a sheet supplied to the heating unit to be (i) at a first speed when performing an image erasing operation on the sheet, and (ii) at a second speed that is slower than the first speed when performing an image fixing operation on the sheet the control unit being configured to permit a first type of job to interrupt a currently-executing job while the image erasing operation is being performed and prohibit a second type of job from interrupting the currently-executing job while the image erasing operation is being performed.

11. The image processing apparatus according to claim 10, wherein the first type of job does not require image fixing.

12. The image processing apparatus according to claim 11, wherein the first type of job is a scanning job.

13. The image processing apparatus according to claim 12, further comprising:
a scanning unit configured to scan an image formed on a sheet,
wherein the scanning unit is configured to scan the image while the image erasing operation is being performed on another sheet.

14. The image processing apparatus according to claim 11, wherein the first type of job is a fax job.

15. The image processing apparatus according to claim 14, further comprising:
a faxing unit configured to transmit and receive data through a network,
wherein the faxing unit is configured to transmit or receive the data while the image erasing operation is being performed on another sheet.

16. The image processing apparatus according to claim 10, wherein the second type of job requires image fixing.

17. The image processing apparatus according to claim 10, wherein the control unit is configured to cause a first interval to be formed between two sheets supplied to the heating unit, and a second interval to be formed between two sheets supplied to the heating unit, the first interval being longer than the second interval.

18. A method for operating an image processing apparatus comprising a heating unit configured to heat an image formed on a sheet, the method comprising:
controlling a temperature of the heating unit to be higher than a first temperature;
supplying a first sheet on which a first image is formed to the heating unit to erase the first image when the temperature of the heating unit is higher than the first temperature;
controlling the temperature of the heating unit to be lower than a second temperature that is lower than the first temperature; and
supplying a second sheet on which a second image is formed to the heating unit to fix the second image onto the sheet when the temperature of the heating unit is lower than the second temperature,
wherein during said supplying of the first sheet, a first type of job is allowed to interrupt a currently-executing job and a second type of job is prohibited from interrupting the currently-executing job the currently-executing job.

19. The method according to claim 18, wherein the first type of job does not require image fixing.

20. The method according to claim 18, wherein the second type of job requires image fixing.

* * * * *